June 24, 1952   R. E. CHRISTIE   2,601,431
ELECTRIC MOTOR MOUNT
Filed Sept. 3, 1949
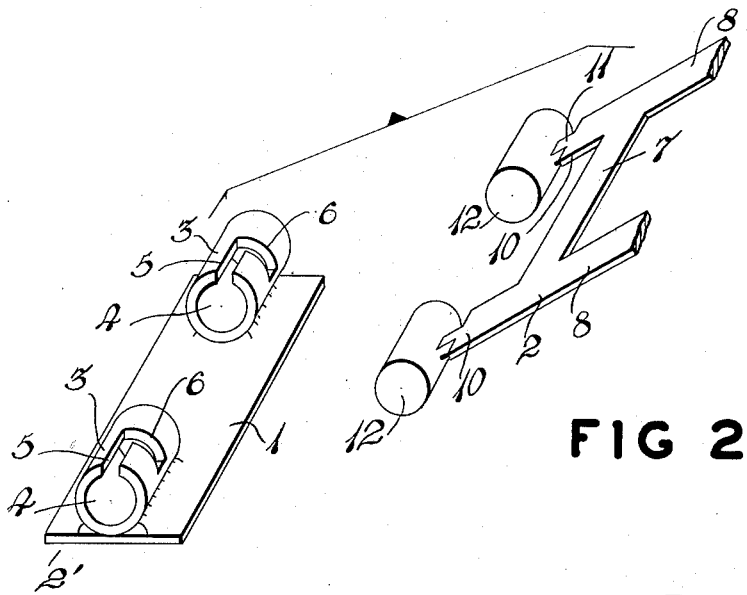
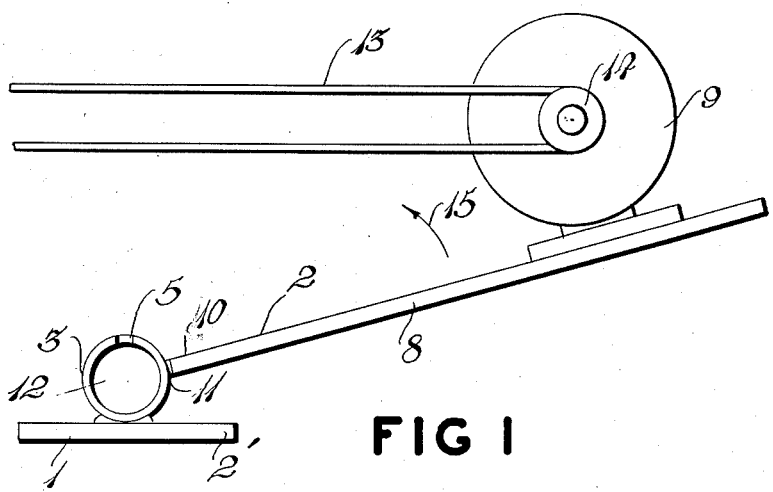
Inventor:
Robert Earl Christie.

Patented June 24, 1952

2,601,431

UNITED STATES PATENT OFFICE 2,601,431

ELECTRIC MOTOR MOUNT

Robert Earl Christie, Glenboro, Manitoba, Canada

Application September 3, 1949, Serial No. 113,974

1 Claim. (Cl. 248—23)

My invention relates to new and useful improvements in motor mounts, an object of my invention being to provide a device of the character herewithin described which utilises a common floating mount engageable with any selected one of a number of bases secured adjacent a plurality of tools or the like intended to be driven by a single motor.

A further object of my invention is to provide a device of the character herewithin described which is adapted to maintain a constant tension upon the belt of the machine being driven.

A still further object of my invention is to provide a device of the character herewithin described by which one motor may be used to drive a plurality of tools, the motor being readily transferred from one tool to another as will hereinafter become apparent.

A still further object of my invention is to provide a device of the character herewithin described which is economical in manufacture, simple in operation, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Fig. 1 is a side elevation of my device with an electric motor in situ, and illustrating the means for obtaining consistent tension of the driving belt.

Fig. 2 is a perspective exploded view of my mount per se.

In the drawings like characters of reference indicate corresponding parts in the different figures.

The increasing use of power tools particularly in home workshops and the like has led to the development of the fractional horse power electric motor having a relatively efficient output. However, it is still necessary under most circumstances, to operate one implement or tool at a time, unless line shafting is used, which means that an electric motor has to be supplied for each tool or else, if only one is used, this has to be moved from tool to tool as required.

The disadvantage of line shafting is the relatively high loss of power which seriously affects the efficiency of fractional horse power motors. Consequently, I have designed the motor mount hereinafter to be described by which means a single electric motor can be moved readily from tool to tool without the necessity for disengaging nuts, bolts or the like, and which has the further advantage of being perfectly aligned once it is in position.

Proceeding now to describe my invention in detail, in will be seen upon reference to the accompanying drawing that my device comprises the two main components, the base 1 and a detachable floating mount collectively designated 2.

A base 1 is situated adjacent each tool to be power-operated and comprises in this embodiment, a rectangular base plate 2' having a pair of spaced, aligned bearing sockets 3 situated thereon. Each bearing socket comprises a relatively short tube having a reamed bearing surface 4 upon the interior thereof and having an open-ended longitudinal slot 5 within the wall thereof extending from one extremity of the socket as clearly shown in Fig. 2.

A circumferential slot 6 is formed within the wall of the socket substantially at right angles to the aforementioned slot 5 communicating therewith at one end thereof.

The detachable floating mount 2 includes the motor supporting structure 7 taking the form of a pair of spaced parallel bars 8 upon which an associated electric motor 9 may be bolted in the conventional manner. The inboard end 10 of the bars 8 are milled to provide relatively short stems 11 upon which are formed or secured bearings 12 taking the form, in this embodiment, of relatively short cylindrical components.

In operation, a base 1 is located adjacent each tool to be driven and securely bolted in position. The associated motor 9 is bolted to the supporting structure 7 and may be positioned within the base 1 adjacent any tool.

To engage the bearings 12 with the sockets 3, the floating mount 2 is held vertically (with relation to the drawings) and the bearings 12 aligned with the sockets 3. In this position the aforementioned stems 11 will register with the longitudinal slots 5 within the walls of the sockets 3 whereupon the mount may be moved sideways until the stems 11 come into alignment with the circumferential slots 6 whereupon the mount may be lowered to take up the position shown in Fig. 1, the stems 11 engaging with the circumferential slots 6. An associated drive belt 13 extends between pulley 14 upon the motor 9 and a pulley (not illustrated) upon an associated tool and this belt should be of sufficient length so that the mount takes up the position substantially as shown in Fig. 1, in which case the weight of the motor acts as a tensioning device for the belt.

If it is desired to change the motor from one tool to another, the belt 13 is disengaged from the pulley 14 whereupon the floating mount 2 is raised to the vertical position in the direction of arrow 15 under which circumstances the stems 11 are now registering with the longitudinal slots 5 thereby permitting the mount to be moved sideways and disengaged from the base 1.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

An interchangeable mounting for electric motors and the like comprising in combination a base having a pair of bearing sockets situated in spaced alignment thereon, a detachable floating mount co-acting therewith, said mount including motor supporting structure comprising a pair of spaced, parallel bars, a stem extending from the inboard end of each bar, a bearing secured to each of said stems, said bearings being engageable within said socket, and a circumferential locating slot within the walls of each bearing socket, an open-ended longitudinal slot within the wall of each bearing socket, each longitudinal slot communicating with one end of each circumferential slot, said stems first engaging said longitudinal slots and then said circumferential slots for the purpose herein specified.

ROBERT EARL CHRISTIE.

REFERENCES CITED

The following references are of record in the file of this patent:

UNITED STATES PATENTS

| Number | Name | Date |
|---|---|---|
| 1,598,292 | Luck | Aug. 31, 1926 |
| 1,942,834 | Railley | Jan. 9, 1934 |